United States Patent [19]

Puukangas et al.

[11] Patent Number: 5,735,167
[45] Date of Patent: Apr. 7, 1998

[54] METHOD AND ARRANGEMENT FOR MEASURING LIQUID LEVEL

[75] Inventors: Pertti Puukangas; Antti Särelä, both of Espoo, Finland

[73] Assignee: Instrumentarium Oy, Helsinki, Finland

[21] Appl. No.: 666,851

[22] Filed: Jun. 19, 1996

[30] Foreign Application Priority Data

Jun. 21, 1995 [FI] Finland .................... 953107

[51] Int. Cl.$^6$ .................................................. G01F 23/26
[52] U.S. Cl. .................................................. 73/304 C
[58] Field of Search .......................... 73/304 C, 290 R; 331/64, 65; 361/284

[56] References Cited

U.S. PATENT DOCUMENTS

| | | | |
|---|---|---|---|
| 2,409,073 | 10/1946 | Sias et al. | 73/304 C |
| 3,293,914 | 12/1966 | Renoult | 73/304 C |
| 3,986,663 | 10/1976 | Jonsson et al. | |
| 4,165,641 | 8/1979 | Pomerantz et al. | 73/304 C |
| 4,423,628 | 1/1984 | Richter | 73/304 C |
| 5,054,319 | 10/1991 | Fling | 73/293 |
| 5,315,872 | 5/1994 | Moser | 361/284 |
| 5,465,619 | 11/1995 | Sotack et al. | 73/304 C |
| 5,546,005 | 8/1996 | Rauchwerger | 73/304 C |

FOREIGN PATENT DOCUMENTS

| | | |
|---|---|---|
| 555526 | 8/1993 | European Pat. Off. . |
| 818317 | 9/1937 | France ...................... 73/304 C |
| 3639455 | 5/1988 | Germany . |
| 1071656 | 6/1967 | United Kingdom . |
| 2025623 | 1/1980 | United Kingdom . |
| WO 92/19305 | 11/1992 | WIPO . |

*Primary Examiner*—G. Bradley Bennett
*Attorney, Agent, or Firm*—Andrus Sceales Starke & Sawall

[57] ABSTRACT

A method and an arrangement for identifying liquid levels, in which method a capacitor is arranged into liquid in a container, between plates of which capacitor, liquid will enter in such a manner that the liquid-filled portion of the space between the plates changes with liquid levels and determines the capacitance of the capacitor. In the invention, a signal obtained from the capacitor is employed, the signal being dependent on the liquid level in the container. A coil is connected to the capacitor forming an electrical circuit with the capacitor, whereby the liquid level, while determining the capacitance of the capacitor, at the same time determines the resonance frequency of the electrical circuit. The resonance frequency is measured from outside the container inductively without a lead-through to the container.

12 Claims, 1 Drawing Sheet

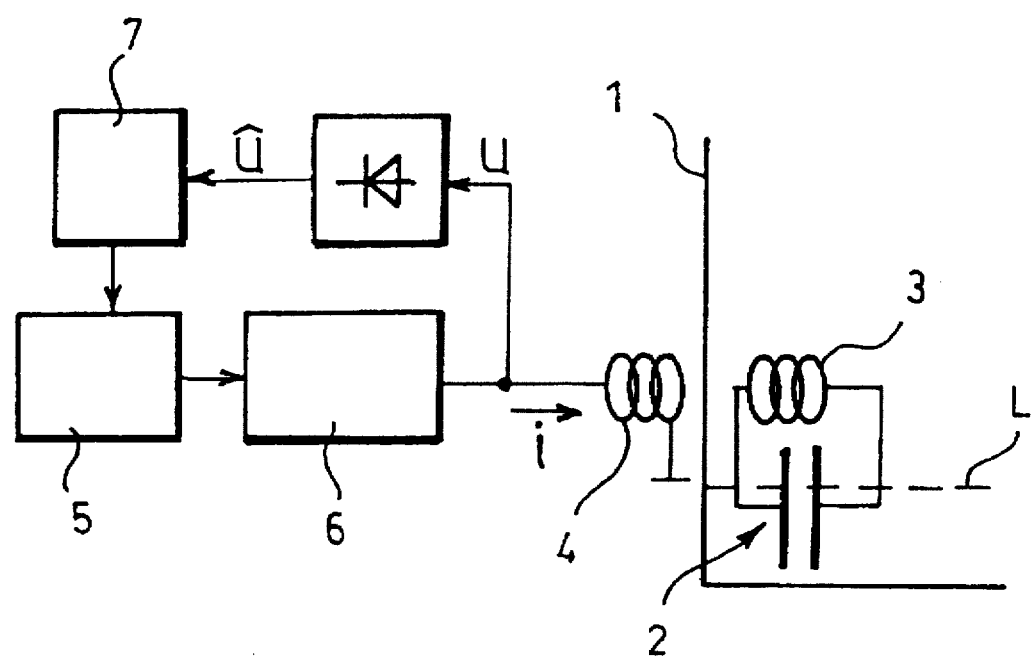

METHOD AND ARRANGEMENT FOR MEASURING LIQUID LEVEL

BACKGROUND OF THE INVENTION

The present invention relates to a method for identifying liquid levels, in which method a capacitor is placed into liquid in a container, between plates of which capacited liquid will enter in such a manner that the liquid-filled portion of the space between the plates changes with liquid level and determines the capacitance of the capacitor, and in which method a signal obtained from the capacitor is employed, the signal being dependent on the liquid level in the container, whereby a coil is connected to the capacitor forming an electrical circuit with the capacitor. The liquid level, while determining the capacitance of the capacitor, at the same time determines the resonance frequency of the electrical circuit. The invention further relates to an arrangement for measuring liquid levels.

In several solutions in different fields of engineering it is necessary to determine how much liquid there is in a closed container. This often occurs for example in a field connected to anaesthesia apparatuses. Both mechanical and electrical identifiers have been developed for the need mentioned above. Prior art solutions could be divided into four main types in the following way.

The first type is based on a float in the liquid, the position of which in the liquid transmits information about the liquid level by means of either a mechanical or electronic regulating device. Another type is, in turn, based on the measurement of liquid level by means of a light transmitter and a light receiver. In the third type, ultra sound is used instead of light. The fourth type is based on the electric properties of liquid. The dielectric constant of liquids often differs from the dielectric constant of air or vapour of said liquid. This difference may be utilized in identifying the level of the liquid. Solutions in PCT Patent Application WO 92/19305 and U.S. Pat. No. 5,054,319 could be mentioned as examples of the above types.

A problem with mechanical measuring devices is that they contain moving parts that may be unreliable especially under difficult conditions. Light sensors require precise attachment mechanisms that are difficult and expensive to accomplish in many places. Ultra sound is not suitable for measuring very small liquid layers, that is, those that are less than 50 mm in depth.

In the solutions of the fourth type mentioned above, the dielectric constant can be employed in two ways. In the first solution, there is a capacitor in a container between the plates of which liquid will enter. The plates are installed in the liquid so that the liquid-filled portion of the plates changes with the liquid level. In that case, the capacitance of the capacitor also depends on the liquid level. The liquid level can be detected by measuring the capacitance of the capacitor. This kind of solution is utilized for measuring the surface level of an anaesthetic agent, for example. A problem is that in prior art solutions the measuring of capacitance requires an electro-mechanical contact and therefore a lead-through to the wall of the container.

In the second prior art solution of the fourth type, a capacitor is formed without mechanical elements being installed inside the container. One plate of the capacitor is installed to the side of the container and the wall of the container acts as the other plate. If there is liquid behind the wall of the container, the capacitance of the capacitor will change. If the wall of the container is of a suitable electrically non-conductive material and not too thick, and the dielectric constant of the liquid great enough, the change of the capacitance can be measured. The greatest advantage of a sensor of this kind is that liquid level can be measured without mechanical changes made in the container. A problem is that the method sets great requirements to the wall of the container and the liquid to be measured. Furthermore, the solution disclosed above is also sensitive to EMC disturbances.

SUMMARY OF THE INVENTION

The invention is based on the fourth type described above as it uses the dielectric constant of liquid. The object of the invention is to achieve a solution by means of which the drawbacks of the prior art can be eliminated. This has been achieved with a method and an arrangement according to the invention. The method according to the invention is characterized in that a coil is arranged inside the liquid container, and that the resonance frequency is measured from outside the container inductively without a lead-through to the container. The arrangement according to the invention is characterized in that a coil is arranged inside the liquid container, and that the arrangement further comprises measuring means for measuring the resonance frequency from outside the container inductively without a lead-through to the container.

The primary advantage of the invention is that all drawbacks present in connection with the prior art can be eliminated by means of the invention. In connection with the solution according to the invention, no lead-throughs to the container are needed and further, no such high requirements need to be set for the container and the liquid to be measured as has been necessary in some of the prior art solutions using the dielectric constant of liquid. A further advantage of the invention is that the basic idea can be realized in a simple way, whereby the introduction of the invention will be advantageous. Because of its simplicity, the use and maintenance costs of the solutions will be low.

BRIEF DESCRIPTION OF THE DRAWINGS

In the following, the invention will be explained in more detail by means of an accompanying drawing, whereby the only figure in the drawing shows a schematic view of one preferred embodiment of the arrangement according to the invention.

DETAILED DESCRIPTION OF THE PREFERRED EMBODIMENT

The figure illustrates a schematic view of one preferred embodiment of the arrangement according to the invention. Reference numeral 1 indicates a container containing liquid. The liquid may be anaesthetic liquid, for example. The liquid level in the container 1 is indicated by reference L. A capacitor 2 is arranged in the liquid in the container 1, between the plates of which capacitor, liquid enters in such a manner that the liquid-filled portion of the space between the plates changes with the liquid level and determines the capacitance of the capacitor 2.

A coil 3 is also installed inside the liquid container 1 in addition to the capacitor 2. The capacitor 2 and the coil 3 are arranged to form an electrical circuit. The liquid level determines the capacitance of the capacitor and also, the resonance frequency of the electrical circuit.

A second coil 4 is arranged outside the container, the coil being connected inductively into the coil 3 inside the container. Reference numeral 5 indicates a control means that can be a microprocessor and reference numeral 6 indicates a frequency generator. The microprocessor 5 controls the frequency generator by means of which alternating current i is supplied to the coil 4. The peak value of the current is kept constant regardless of the frequency. The value of the voltage supplied to the coil 4 is measured by means of a measuring device 7. The measuring device can be an A/D converter, for example. The frequency of which the measured value of the voltage is at its minimum is the resonance frequency of the electrical circuit. The change in the resonance frequency of the electrical circuit in the container can thus be correlated with the liquid level L in the container, whereby the liquid level in the container can be measured in a simple way as shown above.

The following values can be given as exemplary values. In the example, the liquid in the container 1 is sevoflurane used as an anaesthetic liquid the size of the capacitor plates 15 mm×150 mm and the space between the plates 1 mm, the capacitance of the capacitor is between 20 pF (the container empty) and 98 pF (the container full). If the inductance of the coil 3 in the container is 10 μH, the resonance frequency of the electrical circuit is between 5.1 MHz and 11.3 MHz. Other arrangements are also possible. The measuring process determines which frequency range is most advantageous at each time. A smaller frequency value is used when the container is full and a greater value when the container is empty.

The invention combines positive aspects of prior art measurings based on the dielectric constant. The capacitor is installed inside the container, which allows the required sensitivity. The signal proportional to the liquid level is obtained by an inductive connection without any mechanical contact to the sensor itself. This is most advantageous if a detachable container, for example, is used. The inductive connection also makes it possible to obtain a very good EMC protection. The solution according to the invention is not sensitive to the thickness or the material of the wall in the container. It should be noted that if the wall of the container conducts electricity well, the production of stray currents between the coils 4 and 3 should be attenuated significantly.

The embodiment presented above is in no way intended to restrict the invention, but the invention may be modified fully freely within the scope of the claims. Therefore it is evident that the arrangement according to the invention or its details do not necessarily have to be identical to those shown in the figure but other solutions are possible as well. Within the scope of the invention, it is fully possible to use e.g. an oscillator, the frequency of the oscillator being determined by a resonance circuit in the container and so on. It is essential for the invention that an electrical circuit is formed in the container, the resonance frequency of which circuit is measured inductively without a mechanical feed-through to the container.

We claim:

1. A method for identifying liquid levels, in which method a capacitor is arranged into liquid in a container, between plates of which capacitor, liquid will enter in such a manner that the liquid-filled portion of the space between the plates changes with liquid level and determines the capacitance of the capacitor, and in which method a signal obtained from the capacitor is employed, the signal being dependent on the liquid level in the container, whereby a coil is connected to the capacitor forming an electrical circuit with the capacitor, and the liquid level, while determining the capacitance of the capacitor, at the same time determines the resonance frequency of the electrical circuit, the coil being arranged inside the liquid container, and the resonance frequency is measured from outside the container inductively without a lead-through to the container.

2. A method according to claim 1 wherein the resonance frequency is measured by means of a second coil by supplying thereto alternating current that is kept constant at its peak value and by determining the minimum point of the value of the voltage supplied to the second coil, at which point the frequency of the electrical circuit in the container is the resonance frequency of the circuit.

3. A method according to claim 1, wherein the liquid in the container is an anaesthetic agent.

4. An arrangement for measuring liquid levels, in which a capacitor is arranged into liquid in a container, between plates of which capacitor, liquid will enter in such a manner that the liquid-filled portion of the space between the plates changes with liquid level and determines the capacitance of the capacitor, and which arrangement comprises means employed a signal obtained from the capacitor, the signal being dependent on the liquid level in the container, whereby a coil is connected to the capacitor, the coil being arranged to form an electrical circuit with the capacitor, and the liquid level, while determining the capacitance of the capacitor, at the same time determines the resonance frequency of the electrical circuit, the coil being arranged inside the liquid container, and the arrangement further comprising measuring means for measuring the resonance frequency from outside the container inductively without a lead-through to the container.

5. An arrangement according to claim 4, wherein the measuring means for measuring the resonance frequency comprise a second coil, a frequency generator, a control means and a measuring device, whereby the frequency generator is arranged to supply alternating current that is kept constant at its peak value to the second coil, and the minimum point of the value of the voltage supplied to the second coil, at which point the frequency of the electrical circuit in the container is the resonance frequency of the circuit, is determined by means of the measuring device.

6. An arrangement according to claim 5, wherein the control means is a microprocessor.

7. An arrangement according to claim 5, wherein the measuring device is an A/D converter.

8. An arrangement according to claim 4, wherein the liquid in the container is an anaesthetic agent.

9. A method according to claim 2, wherein the liquid in the container is an anaesthetic agent.

10. An arrangement according to claim 5, wherein the liquid in the container is an anaesthetic agent.

11. An arrangement according to claim 6, wherein the liquid in the container is an anaesthetic agent.

12. An arrangement according to claim 7 wherein the liquid in the container is an anaesthetic agent.

* * * * *